United States Patent
Freris et al.

(10) Patent No.: US 10,528,578 B2
(45) Date of Patent: Jan. 7, 2020

(54) METHOD AND DEVICE FOR DATA MINING ON COMPRESSED DATA VECTORS

(71) Applicant: International Business Machines Corporation, Armonk, NY (US)

(72) Inventors: Nikolaos Freris, Lausanne (CH); Francesco Fusco, Zurich (CH); Michail Vlachos, Horgen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1169 days.

(21) Appl. No.: 14/387,139

(22) PCT Filed: Apr. 24, 2013

(86) PCT No.: PCT/IB2013/053228
§ 371 (c)(1),
(2) Date: Sep. 22, 2014

(87) PCT Pub. No.: WO2013/160840
PCT Pub. Date: Oct. 31, 2013

(65) Prior Publication Data
US 2015/0046406 A1 Feb. 12, 2015

(30) Foreign Application Priority Data
Apr. 26, 2012 (GB) .................. 1207453.0

(51) Int. Cl.
*G06F 16/2458* (2019.01)
*G06F 16/23* (2019.01)

(52) U.S. Cl.
CPC ...... *G06F 16/2465* (2019.01); *G06F 16/2365* (2019.01); *G06F 16/2474* (2019.01)

(58) Field of Classification Search
None
See application file for complete search history.

(56) References Cited

U.S. PATENT DOCUMENTS

| 5,721,543 | A |   | 2/1998 | Johnson et al. |
| 5,867,416 | A | * | 2/1999 | Feldmann ............... G06F 17/16 708/801 |

(Continued)

FOREIGN PATENT DOCUMENTS

CN 101969567 A 2/2011

OTHER PUBLICATIONS

Gai, Apr. 12, 2012, https://ieeexplore.ieee.org/abstract/document/6181777 (Year: 2012).*

(Continued)

*Primary Examiner* — Matthew J Ellis
(74) *Attorney, Agent, or Firm* — Cantor Colburn LLP; Daniel Johnson

(57) ABSTRACT

A method for data mining on compressed data vectors by a certain metric being expressible as a function of the Euclidean distance is suggested. In a first step, for each compressed data vector, positions and values of such coefficients having the largest energy in the compressed data vector are stored. In a second step, for each compressed data vector, the coefficients having not the largest energy in the compressed data vector are discarded. In a third step, for each compressed data vector, a compression error is determined in dependence on the discarded coefficients in the compressed data vector. In a fourth step, at least one of an upper and a lower bound for the certain metric is retrieved in dependence on the stored positions and the stored values of the coefficients having the largest energy and the determined compression errors.

11 Claims, 5 Drawing Sheets

(56) References Cited

U.S. PATENT DOCUMENTS

| | | | |
|---|---|---|---|
| 6,009,387 A | 12/1999 | Ramaswamy et al. | |
| 7,663,670 B1* | 2/2010 | Orboubadian | H04N 1/2112 348/231.2 |
| 2008/0256067 A1* | 10/2008 | Nelson | G06F 17/3069 |
| 2009/0177444 A1 | 7/2009 | Wiemker et al. | |
| 2009/0204574 A1* | 8/2009 | Vlachos | G06F 17/30548 |

OTHER PUBLICATIONS

A Aburodes, et al., "Visualise web usage mining: Spanning sequences' impact on periodicity discovery," in Proc. of Int. Conference on Information Visualisation, 2010, pp. 301-309.
A. Mueen, E. J. Keogh, and N. B. Shamlo, "Finding time series motifs in disk-resident data," In Proc. of ICDM, IEEE, 2009, pp. 367-376.
A. Mueen, et al. "Fast Approximate Correlation for Massive Time-Series Data," In Proc. of SIGMOD, Jun. 6-11, 2010, ACM, pp. 171-182.
A. Souza, et al., "Tidal mixing modulation of sea surface temperature and diatom abundance in Southern California," In Continental shelf research, 21 (6-7), 2001, pp. 651-666.
B. Liu, et al., "Measuring the Meaning in Time Series Clustering of Text Search Queries," In Proc. of CIKM, Nov. 5-11, 2006, ACM, pp. 1-2.
C. Wang and X. S. Wang, "Multilevel filtering for high dimensional nearest neighbor search," In ACM SIGMOD Workshop on Data Mining and Knowledge Discovery, 2000, pp. 1-7.
CVX Research [online]; [retrieved on Jan. 14, 2014]; retrieved from the Internethttp://cvxr.com/cvx/CVX Research, "CVX: Matlab Software for Disciplined Conved Programming," Version 2.0 beta, Dec. 2013, pp. 1-1.
D. Rafiei and A. Mendelzon, "Efficient retrieval of similar time sequences using DFT," In Proc. of FODO, Nov. 1998, pp. 1-9.
E. Keogh, et al., "Locally adaptive dimensionality reduction for indexing large time series databases," In Proc. of ACM SIGMOD, May 2001, pp. 151-162.
E. Nygren, et al., "Networked systems research at Akamai," In ACM Operating Systems Review (SIGOPS), 44(3), 2010, pp. 1-1.
H. Choi, et al. "Predicting the Present with Google Trends," Google Technical Report, Apr. 10, 2009, pp. 1-23.
K. Chan, et al. "Haar Wavelets for Efficient Similarity Search of Time-Series: With and Without Time Warping," In IEEE Trans. Knowl. Data Eng. 15(3), May/Jun. 2003, pp. 686-705.
Lofar [online]; [retrieved on Jan. 14, 2014]; retrieved from the Internethttp://www.lofar.org/LOFAR, LOFAR: Low Frequency Array for Radio Astronomy, Jan. 2014, pp. 1-1.
M. Vlachos, et al., "Identifying Similarities, Periodicities & Bursts for Online Search Queries," In Proc. of SIGMOD, Jun. 13-18, 2004, ACM, pp. 1-12.
M. Vlachos, P. Yu, and V. Castelli, "On Periodicity Detection and Structural Periodic Similarity," In Proc.of SDM, 2005, pp. 1-12.
M. Vlachos, S. Kozat, and P. Yu, "Optimal Distance Bounds on Time-Series Data," In Proc. of SDM, 2009,pp. 109-120.
P. L. Noble,et al., "Modeling the Sunspot Number Distribution with a Fokker-Planck Equation," The Astrophysical Journal, 732 (1), May 1, 2011, pp. 1-8.
PCT International Search Report and Written Opinion; International Application No. PCT/IB2013/053228; International Filing Date: Apr. 24, 2013; dated Sep. 5, 2013; pp. 1-11.
R. Agrawal, et al., "Efficient Similarity Search in Sequence Databases," In Proc. of FODO, 1993, pp. 1-16.
S. Boyd and L. Vandenberghe, "Convex Optimization," 1st ed. Cambridge University Press, 2004, pp. 1-730.
S. Chien and N. Immorlica, "Semantic similarity between search engine queries using temporal correlation," In Proc. of WWW, International World Wide Web Conference Committee, May 10-14, 2005, pp. 1-10.
SKA [online]; [retrieved on Jan. 14, 2014]; retrieved from the Internethttp://www.skatelescope.org/SKA, The square Kilometre Array, Jan. 2014, pp. 1-2.
V. Eruhimov, et al., "Combining unsupervised and supervised approaches to feature selection for multivariate signal compression," In Intelligent Data Engineering and Automated Learning , 2006, pp. 480-487.
Y. Cai and R. Ng, "Indexing spatio-temporal trajectories with chebyshev polynomials." In Proc. of ACM SIGMOD, Jun. 13-18, 2004, ACM, pp. 1-12.
T. Basar and G. J. Olsder, "Dynamic Noncooperative Game Theory," 2nd ed. Academic Press, 1995, Chapters 2 and 3 Only (pp. 1-154).

* cited by examiner

METHOD AND DEVICE FOR DATA MINING ON COMPRESSED DATA VECTORS

NATIONAL STAGE PRIORITY

This is a U.S. national stage of application No. PCT/IB2013/053228, filed on Apr. 24, 2013. Priority under 35 U.S.C. § 119(a) and 35 U.S.C. § 365(b) is claimed from Great Britain Patent Application No. 1207453.0, filed Apr. 26, 2012, and all the benefits accruing therefrom under 35 U.S.C. § 119, the contents of which in its entirety are herein incorporated by reference.

FIELD OF THE INVENTION

The invention relates to a method and to a device for data mining on compressed data vectors leveraging a certain metric being expressible as a function of the Euclidean distance.

BACKGROUND

A perennial problem in data analysis is the increasing dataset sizes. This trend dictates the need not only for more efficient compression schemes, but also for analytic operations that work directly on the compressed data. Efficient compression schemes can be designed based on exploiting inherent patterns and structures in the data. Data periodicity is one such characteristic that can significantly boost compression.

Periodic behavior is omnipresent, many types of collected measurements exhibit periodic patterns, including weblog data [1, 2, 3], network measurements [4], environmental and natural processes [5, 6], medical and physiological measurements. The aforementioned are only a few of the numerous scientific and industrial fields that handle periodic data.

When data contain inherent structure, efficient compression can be performed with minimal loss in data quality. This is achievable by encoding the data using only few high-energy coefficients in a complete orthonormal basis representation, e.g., Fourier, Wavelets, Principal Component Analysis (PCA).

In the data-mining community, searching on time-series data under the Euclidean metric has been studied extensively, as e.g., described in [8]. However, such studies have typically considered compression using only the first Fourier or wavelets. The use of diverse sets of coefficients has been studied as described in [1].

The majority of data compression techniques for sequential data use the same set of low-energy coefficients whether using Fourier [7, 8], Wavelets [9, 10] or Chebyshev polynomials [11] as the orthogonal basis for representation and compression. Using the same set of orthogonal coefficients has several advantages: First, it is immediate to compare the respective coefficients. Second, space-partitioning indexing structures, such as R-trees, may be directly used on the compressed data. Third, there is no need to store also the indices of the basis functions that the stored coefficients correspond to. The disadvantage may be that both object reconstruction and distance estimation may be far from optimal for a given fixed compression ratio.

Side-information may also be recorded, such as the energy of the discarded coefficients, to better approximate the distance between compressed sequences by exploiting the Cauchy-Schwartz inequality [13].

In US 2009/0204574 A1 (see [25]), the distance estimation between one compressed and one uncompressed data vector is examined.

BRIEF SUMMARY OF THE INVENTION

According to an embodiment of a first aspect, a method for data mining on compressed data vectors by a certain metric being expressible as a function of the Euclidean distance is suggested. In a first step, for each compressed data vector, positions and values of such coefficients having the largest energy in the compressed data vector are stored. In a second step, for each compressed data vector, the coefficients having not the largest energy in the compressed data vector are discarded. In a third step, for each compressed data vector, a compression error is determined in dependence on the discarded coefficients in the compressed data vector. In a fourth step, at least one of an upper and a lower bound for the certain metric is retrieved in dependence on the stored positions and the stored values of the coefficients having the largest energy and the determined respective compression errors.

By retrieving the upper and a lower bounds for the certain metric in dependence on the stored positions and the stored values of the coefficients having the largest energy and the determined compression errors, the bounds may be provided as tight as possible. Obtaining tight bounds effects a reduction in uncertainty on data-mined similarities of the compressed data vectors. Thus, data-mining on the compressed data vectors may be enhanced.

In particular, because of the provided tightness of the bounds, data-mining on the compressed data vectors represents a good approximation for data-mining on uncompressed data vectors.

The respective compression error is determined in dependence on a sum of the energy of the discarded coefficients in the compressed data vectors.

Contrary to [25], according to embodiments of the present scheme, the distance estimation is examined when both data vectors are compressed using high energy coefficients.

An example for a data vector may be a high dimensional data vector or a time-series data sequence.

According to some implementations, assuming two compressed data vectors, the tightest possible upper and lower bounds on the original distance between the uncompressed objects may be provided. By tightest it is meant that given the information that no better estimate can be derived. Distance estimation is fundamental for data mining, because the majority of mining and learning tasks are distance-based, including clustering, e.g. k-Means or hierarchical, k-NN classification, outlier detection, pattern matching, and the like.

According to some implementations, the problem of tight distance estimation may be formulated as two optimization problems for obtaining lower/upper bounds. Both problems can be solved simultaneously by solving a single convex optimization program. Details are given below.

According to some implementations, the necessary and sufficient Karush-Kuhn-Tucker (KKT) conditions for an optimal solution are derived and the properties of optimal solutions are provided.

According to some implementations, analysis to derive exact algorithms for obtaining the optimal lower/upper bounds are used.

Accordingly, the estimated lower/upper bounds on the distance are optimally tight, so as to minimize the uncertainty on the distance estimation. This implies in turn that the present scheme may least impact any distance-based mining operation operating directly on the compressed data.

According to some implementations, a distinct set of coefficients is maintained for each sequence, and the -norm of the compression error is recorded.

According to some implementations, the tightest provable estimation of the -norm or the correlation is provided. Further, the present scheme may execute at least two orders of magnitudes faster than a numerical solution obtained by a convex solver. The present scheme may be applicable to periodic data, to any sequential or high-dimensional data as well as to any orthogonal data transformation used for the underlying data compression scheme.

In an embodiment, the metric is embodied as the Euclidean distance or as a correlation or as a cosine similarity, and the like.

In a further embodiment, the coefficients in the respective compressed data vector having the largest energy are identified by ordering the coefficients of the compressed data vector according to their respective energy and by selecting a predefined number of the top-ordered coefficients. Therefore, a fixed, pre-determined number of coefficients may be stored for providing a fixed compression ratio.

In a further embodiment, the coefficients in the respective compressed data vector having the largest energy are identified by selecting a minimum number of those coefficients resulting in a predetermined compression error. Here, a fixed, pre-determined compression error may be provided.

In a further embodiment, all coefficients in the respective compressed data vector that have an energy higher than a predefined energy threshold are stored as the coefficients having the largest energy.

In a further embodiment, different positions of coefficients having the largest energy in either or both of the two compressed data vectors are stored. Thus, different sets of coefficients having the largest energy in the compressed data vectors are stored.

In a further embodiment, data vectors are transformed into the compressed data vectors represented by said coefficients by a certain lossy compression transformation having a certain compression ratio.

In a further embodiment, at least one of the compression transformation and the compression ratio are selected.

In a further embodiment, the compression transformation is embodied by an invertible linear transformation having a complete orthonormal basis. Examples for such an invertible linear transformation are Discrete Fourier transformation (DFT), Principle Component Analysis (PCA), a.k.a. Karhunen-Loève expansion, Chebyshev polynomials, and wavelets.

In a further embodiment, the data vectors are embodied by periodic network data transferred over a communication network.

In a further embodiment, the upper and lower bounds are exactly retrieved by a double water-filling algorithm in dependence on the stored positions and the stored values of the coefficients having the largest energy and the determined compression errors, in particular without any approximate numerical method.

In a further embodiment, within the double water-filling algorithm for retrieving the upper and lower bounds for the two compressed data vectors, first positions are used, where the coefficients are discarded for the first compressed data vector and stored for the second compressed data vector, second positions are used, where the coefficients are stored for the first compressed data vector and discarded for the second compressed data vector, and third positions are used, where the positions of the coefficients are mutually discarded for the first and second data vectors.

In a further embodiment, the discarded coefficients of the first compressed data vector at the first positions are estimated by a water-filling algorithm using an optimal estimate of the compression error of the first compressed data vector at the first positions. Further, the discarded coefficients of the second compressed data vector at the second positions are estimated by the water-filling algorithm using an optimal estimate of the compression error of the second compressed data vector at said second positions.

In a further embodiment, the Cauchy-Schwarz inequality is exploited for optimizing the correlations in the third positions of the first and second compressed data vectors.

Any embodiment of the first aspect may be combined with any embodiment of the first aspect to obtain another embodiment of the second aspect.

According to an embodiment of a second aspect, a computer program is suggested which comprises a program code for executing the method of the above first aspect for data mining on compressed data vectors when run on at least one computer.

According to an embodiment of a third aspect, a device for data mining on compressed data vectors by a certain metric being expressible as a function of the Euclidean distance is suggested. The device comprises a storage, a discarder, a determiner, and a retriever. The storage is configured to store positions and values of such coefficients having the largest energy in the respective compressed data vector. The discarder is configured to discard the coefficients having not the largest energy in the respective compressed data vector. The determiner is configured to determine a respective compression error in dependence on the discarded coefficients in the respective compressed data vector. The retriever is configured to retrieve at least one of an upper and a lower bound for the certain metric in dependence on the stored positions and the stored values of the coefficients having the largest energy and the determined compression errors.

The storage may be any storing means. Moreover, the discarder may be any means for discarding, the determiner may be any means for determining, and the retriever may be any means for retrieving.

The respective means may be implemented in hardware and/or in software. If said means are implemented in hardware, it may be embodied as a device, e.g. as a computer or as a processor or as a part of a system, e.g. a computer system. If said means are implemented in software it may be embodied as a computer program product, as a function, as a routine, as a program code or as an executable object.)

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
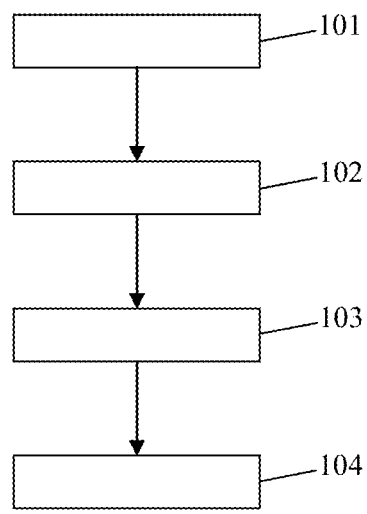
FIG. 1 shows an embodiment of a sequence of method steps for data mining on compressed data vectors.

In FIG. 1, an embodiment of a sequence of method steps for data mining on compressed data vectors by a certain metric being expressible as a function of the Euclidean distance is depicted. The metric may be embodied as the Euclidean distance or as a correlation or as a cosine similarity. The data vectors may be embodied by periodic network data transferred over a communication network. The data vectors are transformed into the compressed data vectors represented by coefficients by a certain lossy compression transformation having a certain compression ratio. In this regard, at least one of the compression transformation and the compression ratio may be selected. Moreover, the compression transformation is embodied by an invertible linear transformation having a complete orthonormal basis, for example by a Discrete Fourier transformation (DFT), by Principle Component Analysis (PCA), by Chebyshev polynomials, or by wavelets.

Said method has the following steps 101 to 104:

In step 101, for each compressed data vector, positions and values of such coefficients having the largest energy in the compressed data vector are stored.

The coefficients in the respective compressed data vector having the largest energy may be identified by the one of the following three alternatives:

In a first alternative, the coefficients of the compressed data vector are ordered according to their respective energy. Then, a predefined number of the top-ordered coefficients are selected.

In a second alternative, the coefficients in the respective compressed data vector having the largest energy are identified by selecting a minimum number of those coefficients resulting in a predetermined compression error.

In a third alternative, all coefficients in the respective compressed data vector that have an energy higher than a predefined energy threshold are stored as the coefficients having the largest energy.

Further, within said step 101, different positions of coefficients having the largest energy in at least two compressed data vectors are stored. As a result, different sets of coefficients having the largest energy in the compressed data vectors are stored.

In step 102, for each compressed data vector, the coefficients having not the largest energy in the compressed data vector are discarded.

In step 103, for each compressed data vector, a compression error is determined in dependence on the discarded coefficients in the compressed data vector. The compression error is reported as the $L_2$-norm of the discarded coefficients.

In step 104, at least one of an upper and a lower bound for the certain metric is retrieved in dependence on the stored positions and the stored values of the coefficients having the largest energy and the determined compression errors.

In particular, the upper and lower bounds are exactly retrieved by a double water-filling algorithm in dependence on the stored positions and the stored values of the coefficients having the largest energy and the determined compression errors.

Within the double water-filling algorithm for retrieving the upper and lower bounds for the two compressed data vectors, first positions (P1) are used, where the coefficients are discarded for the first compressed data vector and stored for the second compressed data vector, second positions (P2) are used, where the coefficients are stored for the first compressed data vector and discarded for the second compressed data vector, and third positions (P3) are used, where the positions of the coefficients are mutually discarded for the first and second data vectors. Moreover, the discarded coefficients of the first compressed data sequence at the first positions (P1) are estimated by a water-filling algorithm using the optimal estimate of the compression error of the first compressed data sequence at the first positions (P1), and wherein the discarded coefficients of the second compressed data sequence at the second positions (P2) are estimated by the water-filling algorithm using the optimal estimate of the compression error of the second compressed data sequence at said second positions (P2). The Cauchy-Schwarz inequality is exploited for optimizing the correlations in the third positions (P3) of the first and second compressed data sequences.

Figure 2:
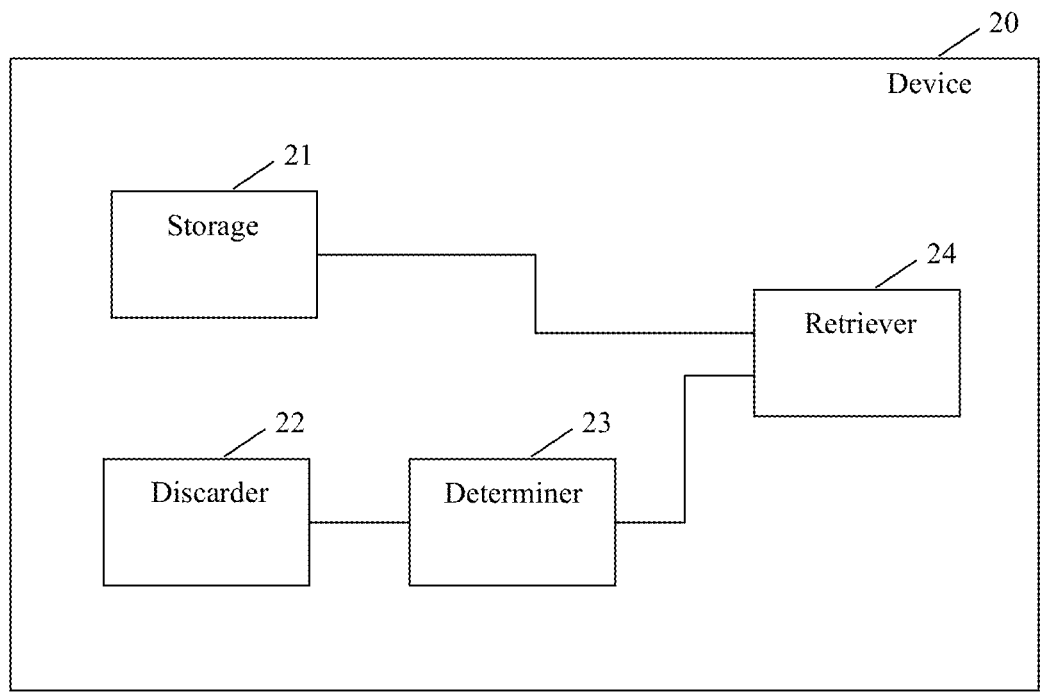
FIG. 2 shows a schematic block diagram of an embodiment of a device for data mining on compressed data vectors.

FIG. 2 shows a schematic block diagram of an embodiment of a device 20 for data mining on compressed data vectors by a certain metric being expressible as a function of the Euclidean distance.

The device 20 includes a storage 21, a discarder 22, a determiner 23, and a retriever 24. The storage 21 is configured to store positions and values of such coefficients having the largest energy in the respective compressed data vector. The discarder 22 is configured to discard the coefficients having not the largest energy in the respective compressed data vector. The determiner 23 is configured to determine a respective compression error in dependence on the discarded coefficients in the respective compressed data vector. The retriever 24 is configured to retrieve at least one of an upper and a lower bound for the certain metric in dependence on the stored positions and the stored values of the coefficients having the largest energy and the determined compression errors.

Figure 3:
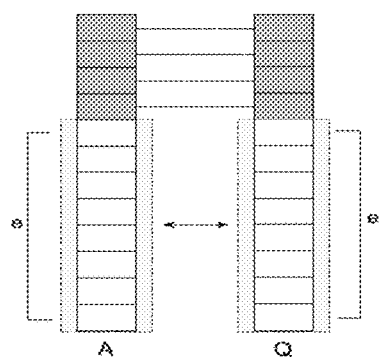
FIG. 3 shows a diagram illustrating distance estimation between a compressed sequence and a query represented in a complete orthonormal basis, wherein both sequences are compressed by storing the first coefficients.
Figure 4:
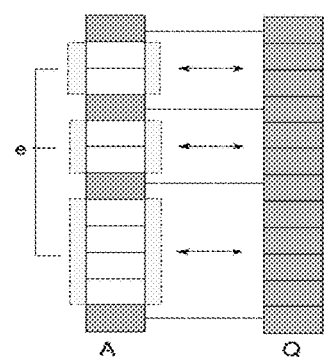
FIG. 4 shows a diagram illustrating distance estimation between a compressed sequence and a query represented in a complete orthonormal basis, wherein the highest energy coefficients are used for one sequence and the other sequence is uncompressed.
Figure 5:
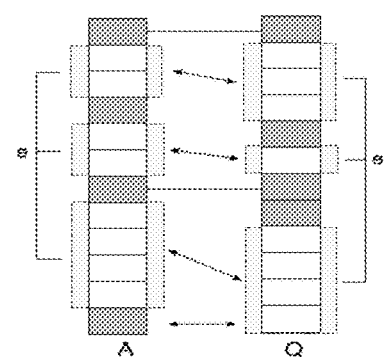
FIG. 5 shows a diagram illustrating a distance estimation between a compressed sequence and a query represented in a complete orthonormal basis, wherein both sequences are compressed using the highest energy coefficients.

For illustrating the enhanced effect of tighter bounds of the present scheme compared to conventional solutions, FIGS. 3 to 5 are depicted.

In this regard, FIG. 3 shows a diagram illustrating distance estimation between a compressed sequence and a query represented in a complete orthonormal basis, wherein both sequences are compressed by storing the first coefficients. The distance in FIG. 3 is 6.4.

FIG. 4 shows a diagram illustrating distance estimation between a compressed sequence and a query represented in a complete orthonormal basis, wherein the highest energy coefficients are used for one sequence and the other sequence is uncompressed. The distance in FIG. 4 is 4.3.

FIG. 5 shows a diagram illustrating a distance estimation between a compressed sequence and a query represented in a complete orthonormal basis, wherein both sequences are compressed using the highest energy coefficients. The distance in FIG. 5 is between 5.7 and 7.2.

Figure 6:
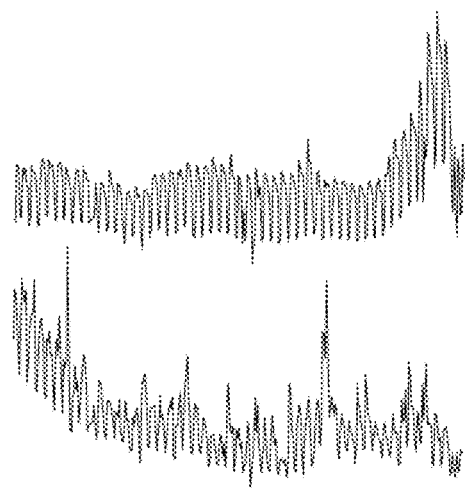
FIG. 6 shows a diagram illustrating two sequences of uncompressed data.
Figure 7:
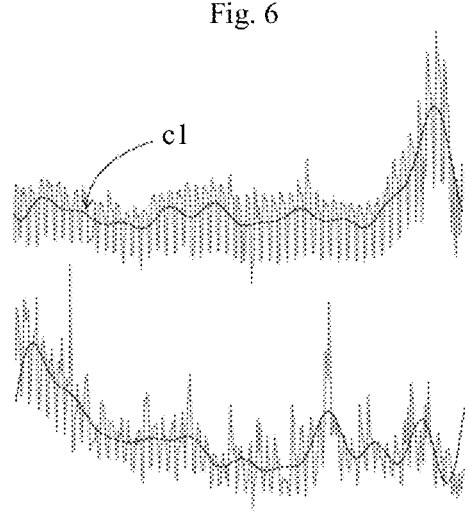
FIG. 7 shows a diagram illustrating two sequences compressed using the first coefficients.
Figure 8:
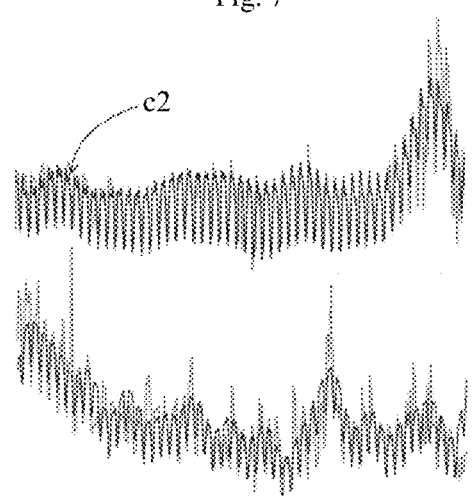
FIG. 8 shows a diagram illustrating two sequences compressed using the coefficients with the highest energy.

Moreover, FIG. 6 shows a diagram illustrating two sequences of uncompressed data, FIG. 7 a diagram illustrating two sequences compressed using the first coefficients (c1), and FIG. 8 a diagram illustrating two sequences compressed using the coefficients with the highest energy (c2).

The following sections Searching Data Using Distance Estimates, Notation, Motivation and Problem Formulation, Equivalent Convex Optimization Problem, and Exact Solutions may illustrate the functional principle of the present invention:

Searching Data Using Distance Estimates

A database DB is considered, that stores sequences as V high-dimensional complex vectors $x^{(i)} \in C^N$, i=1, ... V. The examined search problem may be abstracted as follows: a user is interested in finding the k most 'similar' sequences to a given query sequence q∈DB, under a certain distance metric d:

$$d(\cdot,\cdot): \mathbb{R}^{N \times N} \to \mathbb{C}_+.$$

This is the most basic and yet the most fundamental search and mining operation, known as k-Nearest-Neighbor (k-NN) search. It is a core function in database querying, as well as a fundamental operation in a variety of data-mining and machine-learning algorithms including classification (NN-classifier), clustering, etc. Here, it is focused on the case where d is the standard Euclidean distance, i.e., the norm on $C^N$. It may be noted that other measures, for example time-invariant matching, can be formulated as Euclidean distance on the periodogram [14]. Correlation can also be expressed as an instance of Euclidean distance on properly normalized sequences [15]. Therefore, the present scheme may be applicable on a wide range of distance measures with little or no modification.

Search operations can be quite costly, especially for cases where the dimension N of the sequences is high, because sequences need to be retrieved from the disk for comparison against the query q. An effective way to mitigate this is to retain a compressed representation of the sequences to be used as an initial pre-filtering step. The set of compressed sequences could be small enough to keep in-memory, hence enabling a significant performance speedup.

In essence, this is a multilevel filtering mechanism. With only the compressed sequences available, the exact distance between the query q and a sequence in the database cannot be inferred obviously. However, it is still plausible to obtain under-estimates and over-estimates of the distance, i.e., lower and upper bounds. Using these bounds, a superset of the k-NN answers can be returned, which will be then verified using the uncompressed sequences that will need to be fetched and compared with the query, so that the exact distances can be computed. Such filtering ideas are used in the majority of the data-mining literature for speeding up search operations [7, 8, 16].

Notation:

Consider a se $x=\{x_1, x_2, \ldots, x_N\} \in \mathbb{R}^N$

For compression purposes, x is projected onto an orthonormal basis with $\text{vect}_\subset:\{E_1, E_2, \ldots, E_N\}$ S, where the cases with or are interesting for most practical cases. The result is:

$$x = \sum_{l=1}^{N} X_l E_l$$

$X:\{X_1, X_2, \ldots X_N,\} \subset S$ is defined by:

$$X_l = \langle x, E_l \rangle = E_l^* x := \sum_{j=1}^{N} x_k \overline{E}_{ij}$$

where the notation $\langle \cdot, \cdot \rangle$ is used to denote the standard inner product in, "*" for complex transpose, "−" for the conjugate of a complex number and for the j-th entry of vector.

The linear mapping $x \to X$ given by (4) is denoted by F, and the inverse linear map $X \to x$ is given by, i.e., $X=F(x)$ and. Examples for the invertible linear transformation that are of practical interest include e.g., Discrete Fourier Transform (DFT), PCA, Chebyshev polynomials, wavelets Karhunen-Loève expansion, etc.

As a running example for the present scheme, it is assumed that a sequence is compressed using DFT. The basis consists of sinusoids with different frequencies:

$$E_l = \left\{ \frac{1}{\sqrt{N}} e^{i 2\pi k j/N} \right\}_{j=0}^{N-1}$$

In such a case, the pair (x,X), where X=DFT(x) and x=IDFT(X), the inverse DFT, satisfies $$X_l = \frac{1}{\sqrt{N}} \sum_{k=1}^{N} x_k e^{i 2\pi (k-1)(l-1)/N}, l=1, \ldots, N$$

where i is the imaginary unit. The Euclidean distance is considered between two sequences x, q i.e. the -norm of their difference. By Parseval's theorem, the result is:

$$d(x,q) := \|x-q\|_2 = \|X-Q\|_2$$

Motivation and Problem Formulation

The choice of which coefficients to use has a direct impact on the data approximation quality. Although, it has long been recognized that sequence approximation when using high energy (i.e., best) coefficients is indeed superior [17, 12], there is still a barrier to overcome: accurate distance estimation for such solution.

Consider a sequence represented using its high-energy coefficients; the compressed version of sequence X is described by a set of $C_x$ coefficients that hold the largest energy. The vector describing the positions of those coefficients in X is denoted as $p_x^+$, while the positions of the remaining ones as $p_x^-$.

For any sequence X, the vector $X(p_x^+)$ is stored in the database, which is denoted by $X^+ := (X_i)_{i \in p_x^+}$. The vector of discarded coefficients is denoted by $X^- := (X_i)_{i \in p_x^-}$. In addition to the best coefficients of a sequence, one additional value for the energy of the compression error, $e_x = \|X^-\|_2^2$, i.e. the sum of squared magnitudes of the omitted coefficients, may be recorded.

Then one needs to solve the following minimization (maximization) problem for calculating the lower (upper) bounds on the distance between two sequences based on their compressed versions.

$$\min(\max)\|X - Q\|_2 \qquad (5.1)$$

s.t.

$$|X_l| \le \min_{j \in p_x^+} |X_j| \, \forall \, l \in p_x^-$$

$$|Q_l| \le \min_{j \in p_q^+} |Q_j| \, \forall \, l \in p_q^-$$

$$\sum_{l \in p_x^-} |X_l|^2 = e_x$$

$$\sum_{l \in p_q^-} |Q_l|^2 = e_q$$

$$X^- \in C^{|p_x^-|}, Q^- \in C^{|p_q^-|}$$

where the decision variables are the vectors $X^-$, $Q^-$. The constraints are due to the fact that the high-energy components are used for the compression. Hence, any of the omitted components must have energy lower than the minimum energy of any stored one.

These optimization problems are complex-valued programs; the minimization problem can easily be recast as an equivalent convex program by relaxing the equality constraints into $\le$ inequality constraints. Hence, it can be solved efficiently with numerical methods. However, evaluating an instance of this problem just for a pair of sequences may be not efficient in practice: it requires approximately one second on a modern CPU. Therefore, although a solution can be found numerically, it is generally costly and not tailored for large mining tasks where thousands or millions of such lower/upper bounds on compressed sequences would like to be evaluated. Here is shown how to solve this problem analytically by exploiting the derived optimality conditions.

An Equivalent Convex Optimization Problem

The partition $P=\{P_0, P_1, P_2, P_3\}$ of $\{1, \ldots, N\}$ (see FIG. 9) is considered, where $P_o = p_x^+ \cap p_q^+$ are the common known components in two compressed sequences X,Q.

$P_1 = p_x^- \cap p_q^+$ are the positions where the coefficients are unknown for X but unknown for Q in their compressed versions.

$P_2 = p_x^+ \cap p_q^-$ are the positions where the coefficients of X are known but those of Q are unknown.

$P_3 = p_x^- \cap p_q^-$ are the positions of the coefficients that are mutually unknown for X, Q.

Using the standard notation for the conjugate transpose of a complex vector x, $\Re$ to denote the real part of a complex number, and considering all vectors as column vectors, it is that the squared Euclidean distance is given by $$\|X - Q\|_2^2 = (X - Q)^*(X - Q)$$

$$= \|X\|_2^2 + \|Q\|_2^2 - 2X^*Q$$

$$= \|X\|_2^2 + \|Q\|_2^2 - 4\sum_{i=1}^{N} \Re\{X_i Q_i\}$$

$$= \|X\|_2^2 + \|Q\|_2^2 - 4(\sum_{l \in P_o} \Re\{X_l Q_l\} +$$

$$\sum_{l \in P_1} \Re\{X_l Q_l\} + \sum_{l \in P_2} \Re\{X_l Q_l\} +$$

$$\sum_{l \in P_3} \Re\{X_l Q_l\}$$

Note that $\|X\|_2$, $\|Q\|_2$ can be inferred by summing the squared magnitudes of the known coefficients with the energy of the compression error. Also, the term $\Sigma_{l \in P_o} R\{X_i Q_i\}$ is known, whereas the last three sums are unknown. Considering the polar form, i.e., absolute value $|\cdot|$ and argument $\arg(\cdot)$ $$X_l = |X_l|e^{i\arg(X_l)}, Q_l = |Q_l|e^{i\arg(Q_l)},$$

it is that the decision variables are vectors $|X_l|, \arg(X_l), l \in p_x^-$ as well as $|Q_l|, \arg(Q_l), l \in p_q^-$.

Observe that for $x, y \in C$ with $|x|$, $|x|$ known, it is that $-|x\|y| \le \Re\{xy\} \le |x\|y|$, where the upper bound is attained when $\arg(x) + \arg(y) = 0$ and the lower bound when $\arg(x) + \arg(y) = \pi$. Therefore, both problems (5.1) boil down to the real-valued optimization problem $$\min - \sum_{l \in P_1} a_l b_l - \sum_{l \in P_2} a_l b_l - \sum_{l \in P_3} a_l b_l \qquad (6.2)$$

s.t. $0 \le a_l \le A, \forall \, l \in p_x^-$ $0 \le b_l \le B, \forall \, l \in p_q^-$ $$\sum_{l \in p_x^-} a_l^2 \le e_x$$

$$\sum_{l \in p_q^-} b_l^2 \le e_{xq}$$

where $a_l b_l$ represent, $|X_l|, |Q_l|$ respectively, and $$A := \min_{j \in p_x^+} |X_j|, B := \min_{j \in p_q^+} |Q_j|.$$

Note also that the equality constraints are relaxed to inequality constraints as the objective function of (6.2) is decreasing in all $a_l b_l$ so the optimal function has to satisfy the relaxed inequality constraints with equality, because of the elementary property that $|p_x^-|A^2 \ge e_x$, $|p_q^-|B^2 \ge e_q$. Recall that in the first sum only are known, in the second only are known, and in the third all variables are unknown.

The original problem has been reduced to a single optimization program, which is, however, not convex unless $p_x^- \cap p_q^- = \emptyset$. It is easy to check that the constraint set is convex and compact, however, the bilinear function $f(x,y):= xy$ is convex in each argument alone, but not jointly. The re-parametrization of the decision variables is considered $$x_i = a_x^2, \text{for } i \in p_x^- \text{ and } y_i = b_i^2 \text{ for } i \in p_q^-,$$

we set $Z := A^2$, $Y := B^2$ and the equivalent problem is got:

$$\min - \sum_{i \in P_1} b_i \sqrt{z_i} - \sum_{i \in P_2} a_i \sqrt{y_i} - \sum_{i \in P_3} z_i \sqrt{y_i} \qquad (6.3)$$

s.t. $0 \le z_i \le Z, \forall \, i \in p_x^-$ $0 \le y_i \le Y, \forall \, i \in p_q^-$ $$\sum_{i \in p_x^-} z_i \le e_x$$

$$\sum_{i \in p_q^-} y_i \le e_{xq}$$

Existence of Solutions and Necessary and Sufficient Conditions for Optimality:

The constraint set is a compact convex set, in fact, a compact polyhedron. The function $g(x,y) := \sqrt{x}\sqrt{y}$ is convex but not strictly convex on $R_+^2$. To see this, note that the Hessian exists for all $x,y>0$ and equals $$\nabla^2 g = \frac{1}{4}\begin{pmatrix} x^{-\frac{3}{2}}y^{-\frac{1}{2}} & -x^{-\frac{1}{2}}y^{-\frac{1}{2}} \\ -x^{-\frac{1}{2}}y^{-\frac{1}{2}} & x^{-\frac{1}{2}}y^{-\frac{3}{2}} \end{pmatrix}$$

with eigenvalues $$0, \frac{1}{\sqrt{xy}}\left(\frac{1}{x}+\frac{1}{y}\right),$$

and hence is positive semi-definite, which in turn implies that g is convex [18]. Furthermore, is a strictly convex function of x so that the objective function of (6.3) is convex, and strictly convex only if $p_x^- \cap p_q^- = \emptyset$ it is also a continuous function so solutions exist, i.e., the optimal value is bounded and is attained. It is easy to check that the Slater condition holds, whence the problem satisfies strong duality and there exist Lagrange multipliers [18]. The technical details for simplicity may be skipped, but it is highlighted that this property is substantial because it guarantees that the Karush-Kuhn-Tucker (KKT) necessary conditions [18] for Lagrangian optimality are also sufficient. Therefore, if a solution can be found to satisfy the KKT conditions for the problem, an exact optimal solution and the exact optimal value of the problem are found.

The Lagrangian for the problem is $$L(y, z, \lambda, \mu, \alpha, \beta) := \quad (6.4)$$

$$-2\sum_{i \in P_1} b_i\sqrt{z_i} - 2\sum_{i \in P_2} a_i\sqrt{y_i} - 2\sum_{i \in P_3} \sqrt{z_i}\sqrt{y_i} + \lambda\left(\sum_{i \in p_x^-}(z_i - e_x)\right) +$$

$$\mu\left(\sum_{i \in p_q^-}(y_i - e_q)\right) + \sum_{i \in p_x^-}\alpha_i(z_i - Z) + \sum_{i \in p_q^-}\beta_i(y_i - Y)$$

The KKT conditions are as follows:

$$\text{s.t.} \quad 0 \leq z_i \leq Z, \, 0 \leq y_i \leq Y, \, (PF) \quad (6.5a)$$

$$\sum_{i \in p_x^-} z_i \leq e_x, \sum_{i \in p_x^-} z_i \leq e_Q$$

$$\sum_{i \in p_q^-} y_i \leq e_q$$

$$\lambda, \mu, \alpha_1, \beta_1 \geq 0 \, (PF) \quad (6.5b)$$

$$\alpha_1(z_1 - Z) = 0, (y_1 - Y) = 0 \, (CS) \quad (6.5c)$$

$$\lambda \sum_{i \in p_z^-}(z_i - e_x) = 0, \mu \sum_{i \in p_q^-}(y_i - e_q) = 0$$

$$i \in P_1, \frac{\partial L}{\partial z_i} = -\frac{b_i}{\sqrt{z_i}} + \lambda + \alpha_i = 0 \, (O) \quad (6.5d)$$

$$i \in P_2, \frac{\partial L}{\partial y_i} = -\frac{a_i}{\sqrt{y_i}} + \mu + \beta_i = 0$$

$$i \in P_3, \frac{\partial L}{\partial z_i} = -\frac{\sqrt{y_i}}{\sqrt{z_i}} + \lambda + \alpha_i = 0$$

$$\frac{\partial L}{\partial y_i} = -\frac{\sqrt{z_i}}{\sqrt{y_i}} + \mu + \beta_i = 0,$$

where shorthand notation is used for Primal Feasibility (PF), Dual Feasibility (DF), Complementary Slackness (CS), and Optimality (O) [18].

The optimal value of (6.3) is denoted by $v_{opt} \leq 0$. Then the optimal lower bound (LB) and upper bound (UB) for the distance estimation problem under consideration are given by:

$$LB = \sqrt{\hat{D} + 4v_{opt}} \quad (6.6)$$

$$UB = \sqrt{\hat{D} + 4v_{opt}}$$

$$\hat{D} := \|X\|_2^2 + \|Q\|_2^2 - 4\sum_{i \in p_0} \Re\{X_i Q_i\} \quad (6.6)$$

Exact Solutions

In this section, algorithms for obtaining exact solutions for the optimization problem are studied (6.3). By exact, it is meant that the optimal value is obtained in a finite number of computations as opposed to when using a numerical scheme for convex optimization. In the latter case, an approximate solution is obtained by means of an iterative scheme which converges with finite precision. Before addressing the general problem, a special case is briefly recapped that was dealt with in [12], where the sequence Q was assumed to be uncompressed. In this case, an exact solution is provided via the water-filling algorithm, which will constitute a key building block for obtaining exact solutions to the general problem later on. It is then proceed to study the properties of optimal solutions; the theoretical analysis gives rise to an exact algorithm, see below.

Water-Filling Algorithm

The case that Q is uncompressed is a special instance of the problem with $P_q^- = \emptyset$, whence also. The problem is strictly convex, and (6.5d) yields $$z_i = \left(\frac{b_i}{\lambda - \alpha_i}\right)^2 \Leftrightarrow a_i\left(\frac{b_i}{\lambda + \alpha_i}\right)^2 \quad (7.8)$$

In such a case, the strict convexity guarantees the existence of a unique solution satisfying the KKT conditions as given by the water-filling algorithm, see below. The algorithm progressively increases the unknown coefficients until saturation, i.e., until they reach A, in which case they are fixed. The set C is the set of non-saturated coefficients at the beginning of each iteration, while R denotes the "energy reserve," i.e., the energy that can be used to increase the non-saturated coefficients; denotes the optimal value.

As a shorthand notation, a=waterfill (b, $e_x$, A) is written. It has to be noted that in this case the problem (6.2) for is convex, so the solution can be obtained via the KKT conditions to (6.2), which are different from those for the re-parameterized problem (6.3); this was done in [12]. The analysis and straightforward extensions are summarized in the Lemma for exact solutions.

The Water-filling algorithm for optimal distance estimation between a compressed and uncompressed sequence is shown below:

---

Water-filling algorithm

Inputs: $\{b_i\}_{i \in p_x^-}$, $e_x$, A

Outputs: $\{a_i\}_{i \in p_x^-}$, $\lambda$, $\{\alpha_i\}_{i \in p_x^-}$, $v_{opt}$, R 1. Set $R = e_x$, $C = p_x^-$
2. while $R > 0$ and $C \neq \emptyset$ do
3. 
$$\text{set } \lambda = \sqrt{\frac{\sum_{i \in C} b_i^2}{R}}, \; a_i = \frac{b_i}{\lambda}, i \in C$$

4.     if for some $i \in C$, $a_i > A$ then
5.         $a_i$ A, $C \leftarrow C - \{i\}$
6.     else break;
7.     end if
8.     $R = e_x - (|p_x^-| - |C|)A^2$
9. end while 10. Set $v_{opt} = -\sum_{i \in p_x^-} a_i b_i$ and $$\alpha_i = \begin{cases} 0, & \text{if } a_i < A \\ \frac{b_i}{A} - \lambda, & \text{if } a_i = A \end{cases}$$

---

In the following, some details are given for the Water-Filling-Algorithm:

Two data series X,Q are considered. a_i,b_i represent the absolute values of coefficients X_i,Q_i respectively. X is compressed, while Q is uncompressed (all entries known).

The set of the positions of known coefficients for X is p^+_x and the set of positions of unknown coefficients is p^-_x.

For two vectors, given a set of coefficients of one vector, when the word "corresponding" coefficients of the other one is used, the coefficients corresponding to the same entries are meant.

Inputs:
$\{b_i\}$: coefficients of uncompressed series corresponding to the discarded ones in the compressed vector X
$e_x$: energy of the discarded coefficients of X (compression error)
A: smallest stored coefficient of X
Outputs:
$\{a_i\}$: estimates of the discarded coefficients
$v_{opt}$: optimal estimate of correlation between unknown coefficients of X and corresponding coefficients of Q
R: unused energy in the water-filling process
$\lambda$, $\{\alpha\_l\}$: Lagrange multipliers in the optimization program The algorithm seeks to solve the optimization program for the compressed-uncompressed case, i.e., estimate the discarded coefficients in X at positions $p^-_x$ in compressing vector X that give the tightest lower/upper bound in distance between the two data series X and Q.

In this Water-Filling-Algorithm, the unknown coefficients are estimated as follows: at each step, unknown coefficients are increased proportionally to their corresponding coefficient in uncompressed vector, until they reach threshold A, in which they are fixed in the estimation process. The procedure repeats, and at each step the energy reserve R is reduced by the energy of the fixed coefficients, until all energy has been used (R=0), or all coefficients have been fixed to the upper value A.

Lemma for Exact Solutions

1. If either Set $p_x^- = \emptyset$, or $p_q^- = \emptyset$ (i.e., when at least one of the sequences is uncompressed) it can be obtained an exact solution to the optimization problem (6.2) via the water-filling algorithm.

2. If $P_3 = p_x^- \cap p_q^- = \emptyset$, i.e., when the two compressed sequences do not have any common unknown coefficients the problem is decoupled in a, b and the water-filling algorithm can be separately used to obtain exact solutions to both unknown vectors.

3. If $P_1 = P_2 = \emptyset$ i.e., when both compressed sequences have the same discarded coefficients, the optimal value is simply equal to $-\sqrt{e_x}\sqrt{e_q}$ but there is no unique solution for a, b.

Proof. The first two cases are obvious. For the third one, it has to be noted that it follows immediately from the Cauchy-Schwartz inequality that $-\Sigma_{i \in o_x} a_i b_i \geq -\sqrt{e_x}\sqrt{e_q}$ and in this case this is also attainable, e.g., just consider $$a_l = \sqrt{\frac{e_x}{|P_3|}}, b_l = \sqrt{\frac{e_q}{|P_3|}}$$

which is feasible $|p_x^-|A^2 \geq e_x$, $|p_q^-|B^2 \geq e_q$ since as follows by compressing using the high energy coefficients.

It has been shown how to obtain exact optimal solutions for special cases. To derive efficient algorithms for the general case, first it has to be studied end establish some properties of the optimal solution of (6.3).

Theorem for Properties of Optimal Solutions

Let an augmented optimal solution of (6.2) be denoted by $(a^{opt}, b^{opt})$; where $a^{opt} := \{a_i^{opt}\}_{i \in p_x^- \cap P_q}$ denotes the optimal solution extended to include the known values denotes the optimal solution extended to include the known values $|Q_l|_{l \in p_1}$. It is further $e'_x = e_x - \Sigma_{l \in P_1} a_l^2$, $e'_q = e_q - \Sigma_{l \in P_2} b_l^2$. There are:

1. The optimal solution satisfies $$a^{opt} = \text{waterfill}(b^{opt}, e_x, A) \quad (7.9a)$$

$$b^{opt} = \text{waterfill}(a^{opt}, e_q, B) \quad (7.9b)$$

In particular, it follows that $a_i^{opt} > 0$ if $b_i^{opt} > 0$ as well as that $\{a_i^{opt}\}$, $\{b_i^{opt}\}$ have the same ordering. Additionally, $\min_{l \in P_2} \geq \max_{l \in P_1} b_1 \geq \max_{l \in P_s} b_l$.

2. In the case that at optimality it holds that $e'_x e'_q > 0$ there exists a multitude of solutions. One solution (a, b) satisfies $$a_l = \sqrt{\frac{e'_x}{|P_3|}}, b_l = \sqrt{\frac{e'_q}{|P_3|}}$$

for all $\in P_3$, whence $$\lambda = \sqrt{\frac{e'_q}{e'_x}} \quad (7.10a)$$

$$\mu = \sqrt{\frac{e'_z}{e'_q}}$$

$$\alpha_i = \beta_i = 0 \; \forall \; i \in P_s \quad (7.10b)$$

In particular, $\lambda\mu=1$ and the values $e'_x$, $e'_q$ need to be solutions to the following set of nonlinear equations $$\sum_{l \in P_s} \min\left(b_l^2 \frac{e'_x}{e'_q}, A^2\right) = e_x - e'_x \quad (7.11a)$$

$$\sum_{l \in P_s} \min\left(a_l^2 \frac{e'_q}{e'_x}, B^2\right) = e_q - e'_q \quad (7.11b)$$

3. At optimality, it is not possible to have $e'_x = e'_q = 0$

4. Consider the vectors a, b with $a_1 = |X_1|$, $l \in P_{2,a1} = |X_1|$, $l \in P_1$ and $$\{a_l\}_{l \in P_1} = \text{waterfill}(\{b_l\}_{l \in P_1}, e_x, A) \quad (7.12a)$$

$$\{b_l\}_{l \in P_2} = \text{waterfill}(\{a_l\}_{l \in P_2}, e_q, B) \quad (7.12b)$$

If $e_z \leq |P_1|A^2$ and $e_q \leq |P_2|B^2$, whence $e'_x = e'_q = 0$, then by defining $a_1 = b_1 = 0$ for $l \in P_3$ a globally optimal solution (a, b) is obtained.

Remark. One may be tempted to think that on optimal solution can be derived by water-filling for the coefficients of $\{a_1\}_{l \in aP_1}$, $\{b_1\}_{l \in P_2}$ separately, and then allocating the remaining energies $e'_x$, $e'_q$ to the coefficients in $-\sqrt{e'_x}\sqrt{e'_q}$ leveraging the Cauchy-Schwartz inequality, the value being $\{a_1, b_1\}_{l \in aP_s}$. However, the third and fourth parts of above Theorem state that this not optimal unless $e'_x = e'_q = 0$.

It is shown that there are two possible cases for an optimal solution of (6.2): either or $e'_x, e'_q > 0$. The first case is easy to identify by checking whether (7.12) yields. If this is not the case, there is the latter case and it is needed to find a solution to the set of non linear equations (7.12).

Consider the mapping $T\mathbb{R}_+^2 \to \mathbb{R}_+^2$ defined by $$T((x_1, x_2)) := \left(e_x - \sum_{i \in P_1} \min\left(b_i^2 \frac{x_1}{x_2}, A^2\right), e_q - \sum_{i \in P_2} \min\left(a_i^2 \frac{x_2}{x_1}, B^2\right)\right) \quad (7.13)$$

The set of non linear equations of (7.11) corresponds to a positive fixed point of T, i.e., $e'_x, e'_q = T(e'_x, e'_q)$, $e'_x, e'_q > 0$. Since this problem is of interest only if at optimality, it is known that it is not been in the setup of Theorem, therefore the additional property is had that either, or both. It is defined $$\gamma_a := \min\left\{\gamma \geq 0 : \sum_{i \in P_2} \min\left(a_i^2 \frac{l}{\gamma}, B^2\right) \leq e_q\right\} \quad (7.14)$$

$$\gamma_b := \max\left\{\gamma \geq 0 : \sum_{l \in P_1} \min(b_l^2 \gamma, A^2) \leq e_x\right\}$$

Clearly if then and for any $$\gamma \geq \max_{l \in P_1} \frac{A^2}{b_l^2}$$

we have $\Sigma_{L \in P_1} \min(b_l^2, A^2) = |P_1|A^2$ similarly, if then, and for any $$\gamma \geq \min_{l \in P_2} \frac{a_l^2}{B_2}$$

we have $$\sum_{L \in P_2} \min\left(a_l^2 \frac{l}{y}, B^2\right) = |P_2|B^2$$

the exact value of analytically by sorting $$\left\{\gamma_l^{(b)} := \frac{A^2}{b_l^2}\right\} l \in P_1$$

in increasing order and considering $h_b(\gamma) := \Sigma_{l \in P_1} \min(b_2^l \gamma_l^{(b)}, A^2) - e_x$ and $v_i := h_b(\gamma_i^{(b)})$. In this case, $v_1 < \ldots < v_{|P_1|}$, $v_{|P_1|} > 0$; and there are two possibilities: 1) whence, or 2) there exists some i such that whence. For both ranges of $\gamma$, the function h becomes linear and strictly increasing, and it is elementary to compute its root. A similar argument applies for calculating if is strictly positive, by defining.

Figure 10:
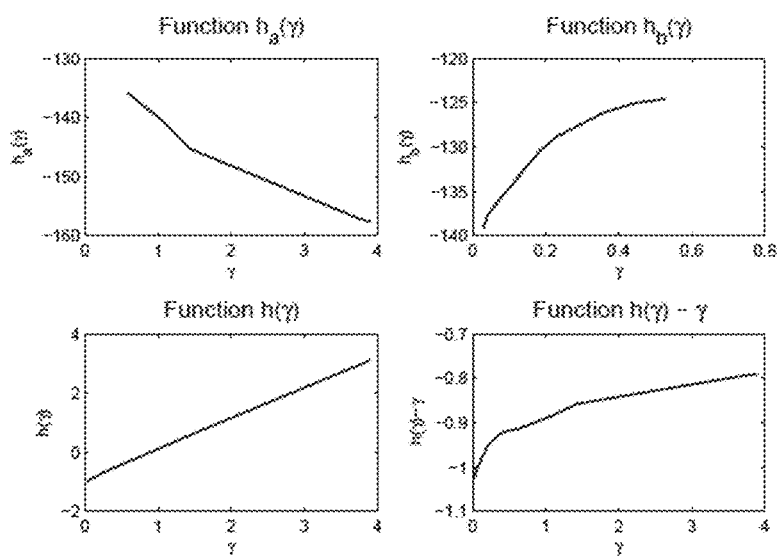
FIG. 10 shows a plot of four functions.
Figure 11:
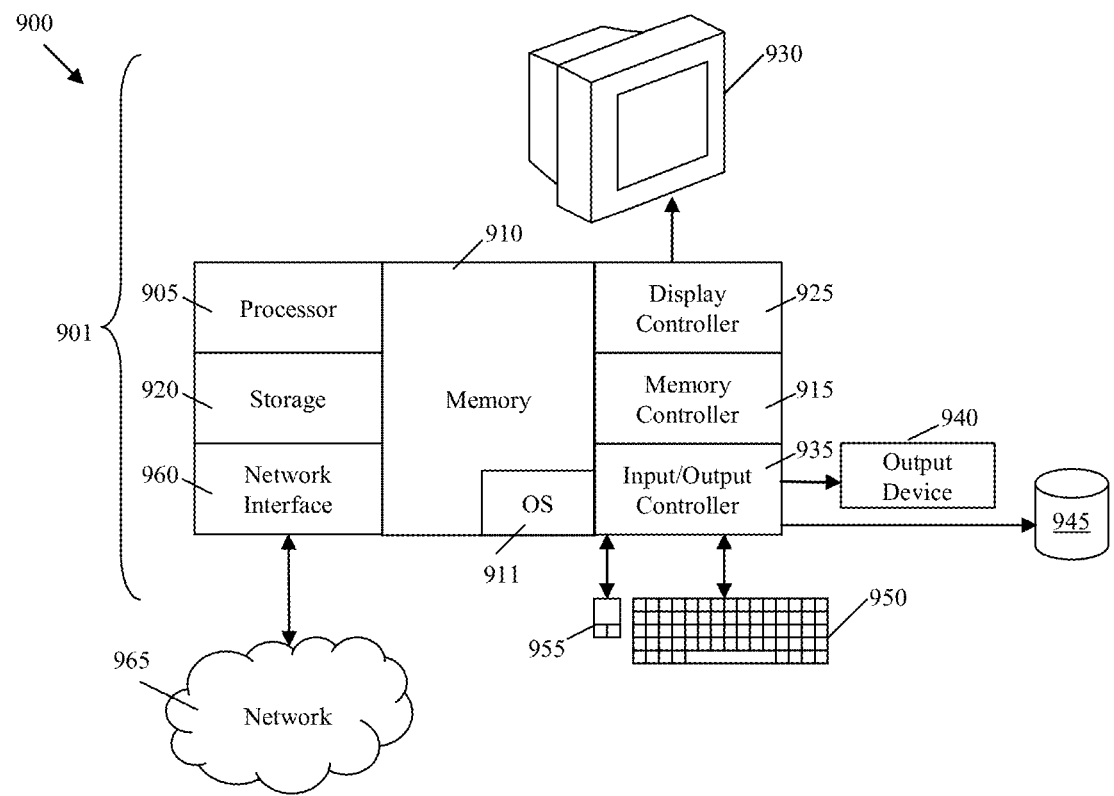
FIG. 11 shows a schematic block diagram of an embodiment of a system adapted for data mining on compressed data vectors.

In this regard, FIG. 10 shows a plot of functions $h_a$, $h_b$, $h$. Regarding the top of FIG. 10, $h_a$ is a bounded decreasing function, which is piecewise linear in $1/\gamma$ with non-increasing slope in $1/\gamma$ $h_b$ is a bounded increasing piecewise linear function of $\gamma$ with non-increasing slope. Regarding the bottom of FIG. 10, h is an increasing function, the linear term $\gamma$ dominates the fraction term which is also increasing, see bottom right.

Theorem for Exact Solution of 7.11

If either $e_x > |P_1|A^2$ or $e_q > |P_2|AB^2$, or both, then the non-linear mapping T has a unique fixed point $e'_x$, $e'_q > 0$. The equation $$\frac{e_x - \sum_{l \in P_1} \min(b_l^2 \gamma, A^2)}{e_q - \sum_{l \in P_2} \min\left(a_l^2 \frac{1}{\gamma}, B^2\right)} = \gamma \quad (7.15)$$

has a unique solution $\bar{\gamma}$ with $\gamma_a \leq \bar{\gamma}$ and $\gamma_a \leq \gamma_b$ when $\gamma_b < +\infty$. The unique fixed point of T (solution of (7.11)) satisfies $$e'_x = e_x - \sum_{l \in P_1} \min(b_l^2 \bar{\gamma}, A^2) \quad (7.16)$$

$$e'_q = e_q - \sum_{l \in P_2} \min\left(a_l^2 \frac{1}{\bar{\gamma}}, B^2\right)$$

Proof. Existence of a fixed point is guaranteed by existence of solutions and Lagrange multiplies for (6.3), since by assumption it is been in the setup of above Theorem. Define $$\gamma := \frac{e'_x}{e'_q}$$

a fixed point $(e'_x, e'_q) = T((e'_x, e'_q))$, $e'_x, e'_q > 0$, corresponds to a root of $$h(\gamma) \frac{e_x - \sum_{l \in P_1} \min(b_l^2 \gamma, A^2)}{e_q - \sum_{l \in P_2} \min\left(a_l^2 \frac{1}{\gamma}, B^2\right)} + \gamma \quad (7.17)$$

For the range $\gamma \geq \gamma_a$ and $\gamma \geq \gamma_b$, if $\gamma_b < +\infty$, it is had that $h(\gamma)$ is continuous and strictly increasing. The facts that $\lim_\gamma \searrow_{\gamma_a} h(\gamma) < 0, \lim \nearrow_{\gamma_b} h(\gamma) > 0$ show existence of a unique root $\bar{\gamma}$ of $h$ corresponding to a unique fixed point of T cf. (7.16).

Remark for Exact Calculation of a Root of h

It is sought to calculate the root of h exactly and efficiently. In doing so, consider the $\{\gamma_l\}_{l \in P_1 \cap P_2}$ where $$\gamma_l := \frac{A}{b_l^2}, l \in P_1, \gamma_l := \frac{a_l^2}{B}, l \in P_2.$$

Then note that for any $\gamma \geq \gamma_l$, $l \in P_1$ it is had that $\min(b_l^2 \gamma, A^2) = A^2$. Similarly, for any $\gamma \leq \gamma_l$, $l \in P_2$, it is had that $$\left(a_l^2 \frac{l}{y}, B^2\right).$$

All such points are ordered in increasing order, and the resulting vector $\gamma := \{\gamma_l\}$ is considered excluding any points below $\gamma_a$ or above $\gamma_b$. It is defined $h_i := h(\gamma_i)$ If for some i, $h_i = 0$ it is done. Otherwise there are three possibilities: 1) there is an i such that $h_i < 0 < h_{i+1}$, 2) $h_i > 0$ or 3) $h_n < 0$. In all cases both the numeration (denominator) of h are linear in $$\gamma\left(\frac{1}{\gamma}\right)$$

for the respective ranges of $\gamma$; $\bar{\gamma}$ is obtained by solving the linear equation $$e_x - \sum_{l \in P_1} \min(b_l^2 \gamma, A^2) = \gamma \left( e_q - \sum_{l \in P_2} \min\left(a_l^2 \frac{1}{\gamma}, B^2\right)\right) \quad (7.18)$$

and using the elementary property that for a linear function f on $[x_0, x_1]$ with $f(x_0)f(x_1) < 0$ the unique root is given by $$\bar{x} = x_0 - \frac{x_1 - x_0}{f(x_1) - f(x_0)} f(x_0)$$

Algorithm for Optimal Distance Estimation

In this section, an algorithm is presented for obtaining the exact optimal upper and lower bounds on the distance between the original sequences, when fully leveraging all information available given their compressed counterparts. First, a simple numerical scheme is presented using a convex solver such as cvx [20] and then the theoretical findings are used to derive an analytical algorithm which is called 'double water-filling'.

Convex Programming is let, and the non-trivial case M>0 is considered. Following the discussion above, the 2M×1 vector $v = (\{a_l\}_{l \in P_1 \cap P_2 \cap P_3}, \{b_l\}_{l \in P_1 \cap P_2 \cap P_3},)$ is set and the following convex problem is considered directly amenable to a numerical solution via a solver such as cvx:

$$\min \Sigma_{l \in P_1 \cap P_2 \cap P_3}(a_l - b_l)^2$$

$$s.t.\ a_l \leq A, \forall l \in p_x^-, b_l \leq B, \forall l \in p_q^-$$

$$\Sigma_{l \in P_x} - a_l^2 \leq e_x, \Sigma_{l \in P_q} - b_l^2 \leq e_q$$

$$a_l = |X_l|, \forall l \in P_2, b_l = |Q_l|, \forall l \in P_1,$$

The lower bound (LB) can be obtained by adding $D' := \Sigma_{l \in p_0}|X_l - Q_l|^2$ to the optimal value of 5.1 and taking the square root; then the upper bound is given by, cf. (6.6).

---

Double water-filling algorithm

Inputs: $\{b_i\}_{i \in P_1}, \{a_i\}_{i \in P_2}, e_x, e_q, A, B$

Outputs: $\{a_i, \alpha_i\}_{i \in p_x^-}, \{b_i, \beta_i\}_{i \in p_q^-}, \lambda, \mu, v_{opt}$ 1. If $p_x^- \cap p_q^- = \emptyset$ then use water-filling algorithm (see Lemma 7.1 parts 1,2); return; endif 2. if $p_x = p_q$ then set $a_l = \sqrt{\frac{e_x}{|P_3|}}$, $b_l = \sqrt{\frac{e_q}{|P_3|}}$, $\alpha_l = \beta_l = 0$ for all $l \in p_x^-$, $v_{opt} = -\sqrt{e_x}\sqrt{e_q}$;
   return: endif 3. if $e_x \leq |P_1|A^2$ and $e_q \leq |P_2|B^2$ then $\{a_l\}_{l \in P_1} = $ waterfill $(\{b_l\}_{l \in P_1}, e_x, A)$ $\{b_l\}_{l \in P_2} = $ waterfill $(\{a_l\}_{l \in P_2}, e_q, B)$ with optimal values $v_{opt}^{(a)}, v_{opt}^{(b)}$ respectively 4. Set $a_l = b_l = \alpha_l = \beta_l = 0$
   for all $l \in P_3$,
   $v_{opt} = -v_{opt}^{(a)} - v_{opt}^{(b)}$; return;

5. endif

6. Calculate the root as in Remark 7.2 and define $e_x', e_q'$ as in (7.16).

7. Set $\{a_l\}_{l \in P_1} = $ waterfill $(\{b_l\}_{l \in P_1}, e_x - e_x', A)$ $\{b_l\}_{l \in P_2} = $ waterfill $(\{a_l\}_{l \in P_2}, e_q - e_q', B)$ with optimal values $v_{opt}^{(a)}, v_{opt}^{(b)}$ respectively 8. Set $a_l = \sqrt{\frac{e_x'}{|P_3|}}$, $b_l = \sqrt{\frac{e_q'}{|P_3|}}$, $\alpha_l = \beta_l = 0, l \in P_3$ and set $v_{opt} = -v_{opt}^{(a)} - v_{opt}^{(b)} - \sqrt{e_x'}\sqrt{e_q'}$

---

Double Water-Filling

Leveraging the theoretical analysis, a simple efficient algorithm is derived to obtain an exact solution to the problem of finding tight lower/upper bound on the distance of two compressed sequences; this is called the "double water-filling algorithm."

The idea is to obtain an exact solution of (6.2) based on the results of above Theorems and Remarks; then the lower/upper bounds are given by (6.6), (6.7).

In the following, some details are given for the Double-Water-Filling-Algorithm:

Two data series X,Q are considered. $a_i, b_i$, represent the absolute values of coefficients $X_i, Q_i$, respectively. Both series are compressed with high energy coefficients, where the positions of known coefficients for X is $p^+_x$ and the positions of unknown coefficients $p^-_x$, and similarly $p^+_q$, $p^-_q$ are defined. It is further defined: ("\cap" is used to symbolize set intersection)

$P_1 := p^-_x \cap p^+_q$, the positions where the coefficients are unknown for X but known for Q in their compressed versions.

$P_2 := p^+_x \cap p^-_q$, the positions where the coefficients of X are known but those of Q are unknown.

$P_3 := p^-_x \cap p^-_q$ are the positions of the coefficients that are mutually unknown for X, Q.

Coefficients $a_i, b_i$, correspond to absolute values of coefficients $X_i, Y_i$.

For two vectors, given a set of coefficients of one vector, when the word "corresponding" coefficients of the other one is used, the coefficients corresponding to the same entries are meant.

Inputs:
{$b_i$}: stored coefficients of Q corresponding to $P_1$
{$a_i$}: stored coefficients of X corresponding to $P_2$
$e_x$, $e_q$: compression errors
A, B: smallest stored coefficients of X, Q respectively Outputs:
$a_i, b_i$: estimates of discarded coefficients of X, Q
$v_{opt}$: optimal estimate of correlation between unknown coefficients of X and corresponding coefficients of Q
$\lambda$, $\mu$, $\alpha_i$, $\beta_i$: Lagrange multipliers in the optimization program The algorithm seeks to solve the optimization program (3.1), i.e., estimate the discarded coefficients in compressing vectors X,Q that give the tightest lower/upper bound in distance between the two data series; this is equivalent to maximizing/minimizing their correlation.

Given compression errors $e_x$, $e_q$, the algorithm seeks to optimally decompose these into:

$$e_x = e_x(P_1) + e_x(P_3)$$

$$e_q = e_q(P_2) + e_q(P_3)$$

so that their distance is minimized/maximized.

Steps 1, 2 are trivial cases where this decomposition is not needed.

Step 3 gives $e_x(P_3) = e_q(P_3) = 0$

The general case is handles in Step 6, where the decomposition is performed via solution of a set of equations; details can be found in the paper.

Once the decomposition is done, the algorithms uses the water-filling algorithm to estimate:
coefficients of X in $P_1$, using energy $e_x(P_1)$
coefficients of Q in $P_2$, using energy $e_q(P_2)$
and uses the Cauchy-Schwarz inequality for maximizing (minimizing) the correlation in $P_3$. See steps 3, 7, 8.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 1 may be implemented in software, as an executable program, the latter executed by suitable digital processing devices. More generally, embodiments of the present invention can be implemented wherein general-purpose digital computers, such as personal computers, workstations, etc., are used.

Figure 9:
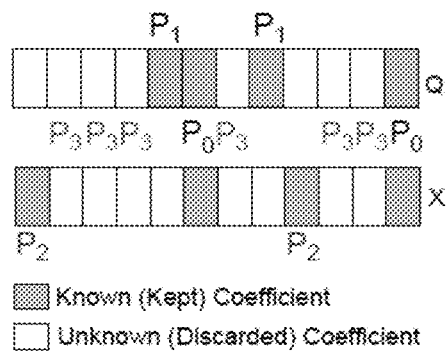
FIG. 9 shows a visual illustration of sets P0, P1, P2, P3.

For instance, the system 900 depicted in FIG. 9 schematically represents a computerized unit 901, e.g., a general-purpose computer. In exemplary embodiments, in terms of hardware architecture, as shown in FIG. 9, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905. For example, the device 20 may be embodied in the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the methods as described herein (e.g., FIG. 1), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 7 or 8) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCES

[1] M. Vlachos, C. Meek, Z. Vagena, and D. Gunopulos, "Identification of Similarities, Periodicities & Bursts for Online Search Queries," in Proc. of SIGMOD, 2004.
[2] S. Chien and N. Immorlica, "Semantic similarity between search engine queries using temporal correlation," in Proc. of WWW, 2005.
[3] B. Lie, R. Jones, and K. Klinkner, "Measuring the Meaning in Time Series Clustering of Text Search Queries," in Proc. of CIKM, 2005.
[4] E. Nygren, R. K. Sitaraman, and J. Wein, "Networked systems research at Akamai," in ACM Operating Systems Review (SIGOPS), 44(3), 2010.
[5] A. Souza and J. Pineda, "Tidal mixing modulation of sea surface temperature and diatom abundance in Southern California," in Continental shelf research, 21 (6-7), 2001, pp. 651-666.
[6] P. L. Noble and M. S. Wheatland, "Modeling the Sunspot Number Distribution with a Fokker-Planck Equation," The Astrophysical Journal, 732 (1), 2011.
[7] R. Agrawal, C. Faloutsos, and A. Swami, "Efficient Similarity Search in Sequence Databases," in Proc. Of FODO, 1993.
[8] D. Rafiei and A. Mendelzon, "Efficient retrieval of similar time sequences using dft," in Proc. of FODO, 1998.
[9] K. Chan, A. W.-C. Fu, and C. T. Yu, "Haar Wavelets for Efficient Similarity Search of Time-Series: With and Without Time Warping," in IEEE Trans. Knowl. Data Eng. 15(3), 2003, pp. 686-705.
[10] V. Eruhimov, V. Martyanov, P. Raulefs, and E. Tuv, "Combining unsupervised and supervised approaches to feature selection for multivariate signal compression," in Intelligent Data Engineering and Automated Learning, 2006, pp. 480-487.
[11] Y. Cai and R. Ng, "Indexing spatio-temporal trajectories with chebyshev polynomials." in Proc. of ACM SIGMOD, 2004.
[12] M. Vlachos, S. Kozat, and P. Yu, "Optimal Distance Bounds on Time-Series Data," in Proc. of SDM, 2009, pp. 109-120.
[13] C. Wang and X. S. Wang, "Multilevel filtering for high dimensional nearest neighbor search," in ACM SIGMOD Workshop on Data Mining and Knowledge Discovery, 2000.
[14] M. Vlachos, P. Yu, and V. Castelli, "On Periodicity Detection and Structural Periodic Similarity," in Proc. of SDM, 2005.
[15] A. Mueen, S. Nath, and J. Lie, "Fast Approximate Correlation for Massive Time-Series Data," in Proc. of SIGMOD, 2010.
[16] A. Mueen, E. J. Keogh, and N. B. Shamlo, "Finding time series motifs in disk-resident data," in Proc. ofICDM, 2009, pp. 367-376.
[17] E. Keogh, K. Chakrabarti, S. Mehrotra, and M. Pazzani, "Locally adaptive dimensionality reduction for indexing large time series databases," in Proc. of ACM SIGMOD, 2001, pp. 151-162.
[18] S. Boyd and L. Vandenberghe, Convex Optimization, 1st ed. Cambridge University Press, 2004.
[19] T. Basar and G. J. Olsder, Dynamic Noncooperative Game Theory, 2nd ed. Academic Press, 1995.
[20] "CVX: Matlab software for disciplined convex programming. ver. 1.21," http://www.stanford.edu/boyd/cvx/, 2011.
[21] A. Alkilany, "Visualise web usage mining: Spanning sequences' impact on periodicity discovery," in Proc. of Int. Conference on Information Visualisation, 2010, pp. 301-309.
[22] H. Choi and H. Varian, "Predicting the Present with Google Trends," Google Technical Report, 2009.
[23] "LOFAR: Low Frequency Array for radio astronomy," http://www.lofar.org/.
[24] "SKA:Square Kilometer Array Telescope," http://www.skatelescope.org.
[25] US 2009/0204574 A1

The invention claimed is:
1. A method for data mining on compressed data vectors by a certain metric being expressible as a function of the Euclidean distance, the compressed data vectors including a first compressed data vector and a second compressed data vector, the method comprising:
storing, for the first compressed data vector, a first set of coefficients having the largest energy in the first compressed data vector;
storing, for the second compressed data vector, a second set of coefficients having the largest energy in the second compressed data vector;
discarding, for the first compressed data vector, a third set of coefficients having not the largest energy in the first compressed data vector;
discarding, for the second compressed data vector, a fourth set of coefficients having not the largest energy in the second compressed data vector;
determining a first compression error corresponding to the first compressed data vector and a second compression error corresponding to the second compressed data vector in dependence on the discarded third set of coefficients and the discarded fourth set of coefficients, respectively; and
retrieving an upper bound and a lower bound for the certain metric based at least in part on the stored first set of coefficients having the largest energy and the stored second set of coefficients having the largest energy and the determined first compression error and second compression error, wherein retrieving the upper bound and the lower bound comprise:

storing a first set of positions corresponding to a subset of coefficients that are discarded from the first compressed data vector and a subset of coefficients in-that are stored from the second compressed data vector;

storing a second set of positions corresponding to a subset of coefficients that are stored from the first compressed data vector and a subset of coefficients that are discarded from the second compressed data vector and storing a third set of positions corresponding to a subset of coefficients that are mutually discarded from the first compressed data vector and from the second compressed data vector;

exploiting the Cauchy-Schwarz inequality to optimize correlations in the third set of positions of the first compressed data vector and the second compressed data vector, and wherein retrieving the upper bound further comprises increasing unknown coefficients in each of the first compressed data vector and the second compressed data vector proportionally to corresponding coefficients in a respective uncompressed data vector until a threshold value is reached, fixing the unknown coefficients to the threshold value, and reducing an energy reserve by a combined energy of the fixed coefficients until the energy reserve has been used.

2. The method of claim 1, wherein the metric is embodied as one of the Euclidean distance, a correlation, or a cosine similarity.

3. The method of claim 1, further comprising determining the first set of coefficients in the first compressed data vector by ordering coefficients of the first compressed data vector according to their respective energy and selecting a predefined number of the top-ordered coefficients.

4. The method of claim 1, further comprising determining the first set of coefficients in the first compressed data vector by selecting a minimum number of coefficients in the first compressed data vector that result in a predetermined compression error.

5. The method of claim 1, further comprising determining the first set of coefficients in the first compressed data vector by coefficients in the first compressed data vector having an energy higher than a predefined energy threshold.

6. The method of claim 1, further comprising transforming a first uncompressed data vector into the first compressed data vector using a lossy compression transformation having an associated compression ratio.

7. The method of claim 6, further comprising selecting at least one of the lossy compression transformation or the compression ratio.

8. The method of claim 7, wherein the compression transformation is embodied by an invertible linear transformation having a complete orthonormal basis comprising at least one of a Discrete Fourier transformation (DFT), a Principle Component Analysis (PCA), Chebyshev polynomials, or wavelets.

9. The method of claim 1, wherein retrieving the upper bound and the lower bound further comprises estimating the discarded coefficients of the first compressed data vector corresponding to the first set of positions using an optimal estimate of the first compression error of the first compressed data vector at the first set of positions and estimating the discarded coefficients of the second compressed data vector corresponding to the second set of positions using an optimal estimate of the second compression error of the second compressed data vector at the second set of positions.

10. A computer program comprising a program code for executing the method of claim 1 for data mining on compressed data vectors when run on at least one computer.

11. A device for data mining on compressed data vectors by a certain metric being expressible as a function of the Euclidean distance, the compressed data vectors including a first compressed data vector and a second compressed data vector, the device comprising:

a storage for storing positions and coefficients having the largest energy in the first compressed data vector and the second compressed data vector;

a computer processor; and a memory storing instructions executable by the computer processor to;

store, for the first compressed vector, a first set of coefficients having the largest energy in the first compressed data vector;

store, for the second compressed data vector, a second set of coefficients having the largest energy in the second compressed data vector;

discard, for the first compressed data vector, a third set of coefficients having not the largest energy in the first compressed data vector;

discard, for the second compressed data vector, a fourth set of coefficients having not the largest energy in the second compressed data vector; determine a first compression error corresponding to the first compressed data vector and a second compression error corresponding to the second compressed data vector based at least in part on the discarded third set of coefficients and the discarded fourth set of coefficients, respectively;

retrieve an upper bound and a lower bound for the certain metric based at least in part on the stored first set of coefficients having the largest energy and the stored second set of coefficients having the largest energy and the determined first compression error and second compression error, wherein retrieving the upper bound and the lower bound comprises:

storing a first set of positions corresponding to a subset of coefficients that are discarded from the first compressed data vector and a subset of coefficients that are stored from the second compressed data vector;

storing a second set of positions corresponding to a subset of coefficients 4n that are stored from the first compressed data vector and a subset of coefficients that are discarded from the second compressed data vector and storing a third set of positions corresponding to a subset of coefficients that are mutually discarded from the first compressed data vector and from the second compressed data vector, and exploiting the Cauchy-Schwarz inequality to optimize correlations in the third set of positions of the first compressed data vector and the second compressed data vector wherein retrieving the upper bound further comprises increasing unknown coefficients in each of the first compressed data vector and the second compressed data vector proportionally to corresponding coefficients in a respective uncompressed data vector until a threshold value is reached, fixing the unknown coefficients to the threshold value, and reducing an energy reserve by a combined energy of the fixed coefficients until the energy reserve has been used.

* * * * *